(12) United States Patent
Spangler (10) Patent No.: US 7,077,097 B2
(45) Date of Patent: Jul. 18, 2006

(54) CRANKSHAFT WITH CONTINUOUS MAIN JOURNAL AND CORRESPONDING CONNECTING STRUCTURE

(76) Inventor: Kendall Lee Spangler, 385 Adams Ridge Rd., Clay City, KY (US) 40312

( * ) Notice: Subject to any disclaimer, the term of this patent is extended or adjusted under 35 U.S.C. 154(b) by 0 days.

(21) Appl. No.: 10/487,659

(22) PCT Filed: Aug. 23, 2002

(86) PCT No.: PCT/US02/27075

§ 371 (c)(1),
(2), (4) Date: Jun. 22, 2004

(87) PCT Pub. No.: WO03/019020

PCT Pub. Date: Mar. 6, 2003

(65) Prior Publication Data

US 2004/0231456 A1 Nov. 25, 2004

Related U.S. Application Data

(60) Provisional application No. 60/388,636, filed on Jun. 14, 2002, provisional application No. 60/314,750, filed on Aug. 24, 2001.

(51) Int. Cl.
*F02B 75/32* (2006.01)
(52) U.S. Cl. ..................... 123/197.4; 74/595
(58) Field of Classification Search ............ 123/197.1, 123/197.3, 197.4; 74/595
See application file for complete search history.

(56) References Cited

U.S. PATENT DOCUMENTS

| 3,059,502 A | * | 10/1962 | Munz ........................ 74/600 |
| 3,175,544 A | * | 3/1965 | Hughes ..................... 123/54.2 |
| 4,102,410 A | | 7/1978 | Ross |
| 4,747,318 A | | 5/1988 | Forrester |
| 4,773,325 A | | 9/1988 | Shiokawa et al. |
| 4,891,998 A | | 1/1990 | Tourville |
| 6,401,678 B1 | | 6/2002 | Billetdeaux |
| 6,401,686 B1 | | 6/2002 | Prueitt et al. |

FOREIGN PATENT DOCUMENTS

DE 3723929 C1 * 1/1989

* cited by examiner

*Primary Examiner*—Noah P. Kamen
(74) *Attorney, Agent, or Firm*—King & Schickli, PLLC

(57) ABSTRACT

A cranshaft including a continuous first or main journal and at least one eccentric second journal is disclosed. A corresponding connecting structure includes a pair of channels for receiving the journals. When the connecting structure is driven in a reciprocating fashion, it causes the crankshaft to rotate, or vice versa. A separate connecting structure may be associated with the continuous main journal and each eccentric journal forming part of the crankshaft. The connecting structure may include a single piston, or a pair of pistons in an opposed relationship, each corresponding to a different cylinder in an internal combustion engine. Alternatively, the connecting structure may include a tool, such as a saw blade, and cause it to reciprocate upon rotation of the crankshaft.

29 Claims, 8 Drawing Sheets

CRANKSHAFT WITH CONTINUOUS MAIN JOURNAL AND CORRESPONDING CONNECTING STRUCTURE

This application claims the benefit of the filing date of U.S. Provisional Patent Application Ser. No. 60/314,750, filed Aug. 24, 2001 and Ser. No. 60/388,636, filed Jun. 14, 2002.

FIELD OF THE INVENTION

The present invention relates generally to devices for converting rectilinear motion into rotary motion and, more particularly, to a crankshaft including a continuous main journal and a corresponding connecting structure.

BACKGROUND OF THE INVENTION

In many machines, crankshafts serve the important function of converting rectilinear motion to rotary motion. For example, in machines including internal combustion engines with pistons, such as automobiles and airplanes, a crankshaft is used to convert the rectilinear movement of the pistons created upon combustion into the rotary motion ultimately used to drive the wheels, propeller, or the like. As used in these types of arrangements, the crankshaft typically includes main bearing journals and connecting rod journals, both of which are connected to spaced, outwardly directed support structures called crank arms. The main bearing journals are normally provided at spaced intervals along the length of the entire crankshaft between adjacent pairs of crank arms. The connecting rod journals, or crank pins, are attached to the crankshaft between the opposite ends of the crank arms, also at spaced intervals. As the name suggests, the connecting rod journals provide the bearing surface for the connecting rod associated with an adjacent piston (or pistons, in the case where two pistons are connected to the same connecting rod journal). In the usual arrangement, the two types of journals are eccentric to each other. Hence, as the pistons move to and fro, the connecting rods either push or pull on the connecting rod journals and cause the crankshaft to rotate 360 degrees.

Despite the popularity of this arrangement, one significant downside is that, because the main bearing journals are discontinuous (that is, provided between the crank arms at spaced intervals), the crankshaft is susceptible to twisting and bending (possibly as much as 16° when subjected to high loads). This bending is troublesome, since it not only reduces efficiency and creates timing issues, but may also cause cracks to form at the interface between the crank arms and the journals that can ultimately lead to mechanical failure of the crankshaft. Another problem with this arrangement is that the crankshaft is subjected to significant vibrations because of the presence of the connecting rods simultaneously pushing and pulling on each individual connecting rod journal. Due to these inherent limitations, crankshafts constructed in the foregoing manner are somewhat limited both in service life and in the amount of power that can be transmitted.

Recent designs have attempted to address these problems, such as by adding support structures or counterweights to the crankshaft or attempting to make it more rigid. Although these measures have extended the service life of the crankshaft, increased the amount of power that can be transmitted, and reduced vibrations, other problems result. For example, a consequence of adding support structures is that the crankshaft is made larger, which necessarily increases the size of the engine in which it is used. Additionally, the more complicated the design, the more the manufacturing cost of the crankshaft increases.

Thus, a need is identified for a crankshaft that provides all the advantages of the prior art designs, but eliminates the many disadvantages. The crankshaft would be significantly stronger and better able to resist bending without a corresponding increase in size or a significant increase in weight. The connecting rods required in most prior art proposals would be eliminated, which reduces the complexity of the design and decreases the amount of vibrations experienced by the crankshaft during operation. Overall, the arrangement provided would be a significant improvement over prior art proposals, especially in terms of ease of manufacture and reliability.

SUMMARY OF THE INVENTION

In accordance with a first aspect of the invention, a crankshaft for converting rectilinear motion to rotary motion or vice versa is disclosed. The crank shaft comprises first and second spaced crank structures having opposed inner surfaces and first and second spaced, generally parallel journals. Each journal extends at least between the opposed inner surfaces and interconnects the first and second crank structures. The first and second generally parallel journals extending between the crank structures serve to strengthen the crankshaft and make it more resistant to bending.

In one embodiment, each crank structure is an elongated arm having a first end and a second end. The first journal extends through the first ends of the arms in a continuous fashion and the second journal extends between the second ends of the arms. Alternatively, each crank structure may be a generally flat plate having a center region and a peripheral region, in which case the first journal extends through the center regions of the plates and the second journal extends at least between the peripheral regions. Preferably, the the flat plates are generally circular disks.

It is also possible to provide a third crank structure spaced from the second crank structure, with the first journal being continuous and interconnecting the first, second, and third crank structures. A third journal may also be spaced from and extend generally parallel to the first journal for interconnecting the second and third crank structures. In one alternate embodiment, the second and third journals are not axially aligned.

Yet another possibility is to include a fourth crank structure spaced from the third crank structure, with first journal being continuous and interconnecting the first, second, third, and fourth crank structures. A fourth journal maybe spaced from and extend generally parallel to the first journal for interconnecting the third and fourth crank structures. The first and second crank structures may be elongated arms that project in a first direction and the third and fourth crank structures may be elongated arms that project in a second direction generally opposite the first direction. Alternatively, the first, second, third and fourth crank structures may be generally circular disks, each having a center region through which the first journal extends in a continuous fashion and a peripheral region for engaging the second, third, or fourth journal, respectively. The second, third, and fourth journals extending between the disks may not be axially aligned. Also, the crankshaft may include a plurality of crank structures interconnected by a continuous first journal, with a second journal extending between selected pairs of the crank structures. A method of converting rectilinear motion to rotary motion using the crankshaft described above is also contemplated.

In accordance with a second aspect of the invention, an apparatus for converting rectilinear motion to rotary motion or vice versa is disclosed. The apparatus comprises a crankshaft mounted for rotation about an axis. The crankshaft includes a plurality (defined as at least two) of crank structures connected by a first journal. At least two of said crank structures (which may be the plurality) having a second journal extending therebetween. The apparatus further comprises a connecting structure mounted for moving in a reciprocating fashion relative to the axis. The connecting structure includes at least one channel for receiving the first journal and a surface for engaging the second journal or a bearing structure associated therewith as the connecting structure reciprocates. Consequently, the reciprocating movement of the connecting structure causes the crankshaft to rotate or vice versa.

In one embodiment, the engagement surface is defined by a second channel in the connecting structure. Preferably, the first and second channels are generally perpendicular to each other. The connecting structure may be connected or coupled to a first piston at one end, such that the piston provides the force for creating the rectilinear motion. The connecting structure may be connected to a second piston at a second end, such that the first and second pistons are associated with the first and second journals of the crankshaft and move in a horizontally opposed fashion to cause the crankshaft to rotate. The bearing structure associated with the second journal is preferably adapted for engaging and traveling in the first channel.

In one embodiment, a plurality of second journals are provided, each extending between opposed inner surfaces of adjacent pairs of said crank structures. Alternatively, a plurality of second journals may be provided, each extending between selected pairs of adjacent crank structures. The second journals need not be axially aligned. The crank structures may be elongated arms, disks, or portions thereof. The apparatus may further include a motor for rotating the crankshaft.

In accordance with a third aspect of the invention, a connecting structure for use in combination with a crankshaft having first and second spaced journals interconnecting at least one pair of adjacent crank structures, at least one of said journals defining an axis of rotation for the other, is disclosed. The connecting structure comprises a first channel for receiving and allowing the first journal to move to and fro and an engagement surface oriented generally perpendicular to the first channel for engaging the second journal. The engagement surface may be part of a second channel oriented generally perpendicular to the first channel. The connecting structure may include a first piston at one end and a second piston at the other end, preferably in an opposed relationship. The connecting structure may further include a saw blade.

In accordance with a fourth aspect of the invention, an engine is disclosed. The engine comprises at least one cylinder for receiving a piston. The piston is coupled to a connecting structure having a first channel and an engagement surface. The first channel receives the first continuous journal of a crankshaft and the engagement surface engages a second journal or a structure associated therewith. As a result, the reciprocating rectilinear movement of the piston is converted into rotary motion by the engagement between the connecting structure and the crankshaft.

DETAILED DESCRIPTION OF THE INVENTION

Figure 1:
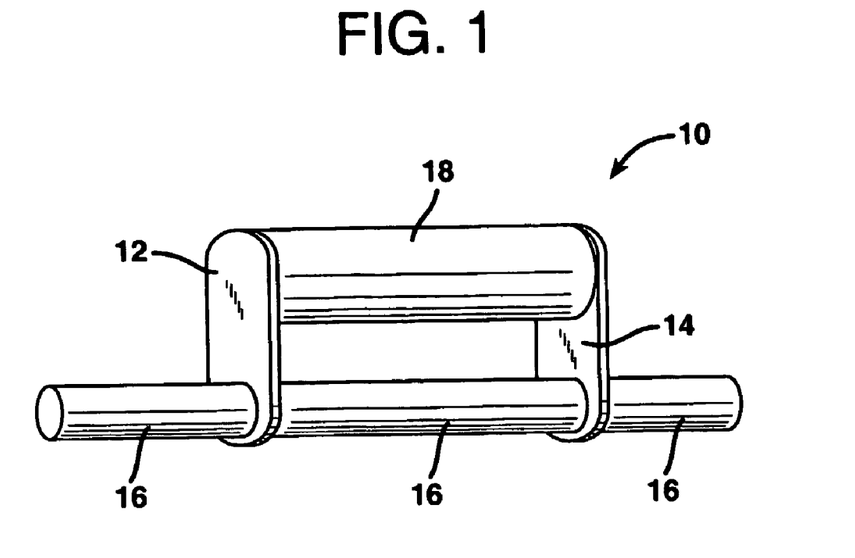
FIG. 1 is a perspective view showing one possible embodiment of the crankshaft forming part of the present invention.

Reference is now made to FIG. 1 of the attached drawings, which shows one possible embodiment of the improved crankshaft 10 forming one aspect of the present invention. In this exemplary embodiment, the crankshaft 10 includes at least one pair of crank structures 12, 14, which are shown in FIG. 1 as elongated arms having first and second ends. A first or main journal 16 extends continuously through one end of at least one of the arms and engages or extends through the other arm. A second, eccentric journal 18 extends between the opposite end of the arms at a position spaced from the main journal 16. As should be appreciated, a continuous portion of the first or main journal 16 may also extend beyond one or both arms to provide support for the crankshaft 10 as it rotates and, if applicable, to transmit rotary motion.

Figure 2A:
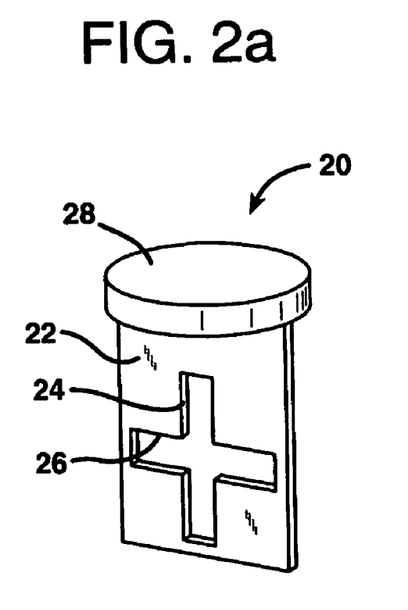
FIG. 2a is a generally front plan view of one possible embodiment of a connecting structure forming part of the present invention.
Figure 2B:
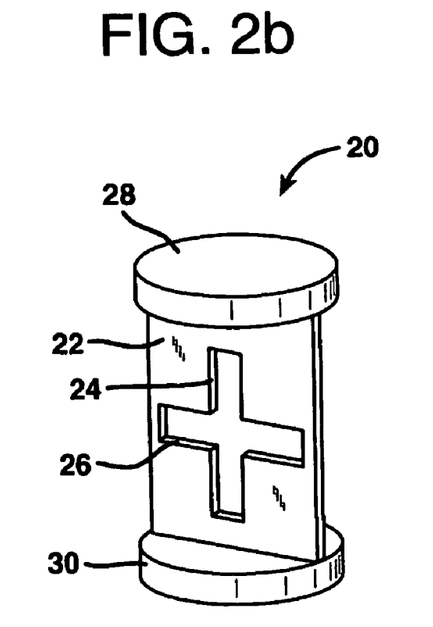
FIG. 2b is a generally front plan view of a connecting structure similar to the one shown in FIG. 2a, but including two opposed pistons.

With reference to FIGS. 2a and 2b, examples of connecting structures 20 for possible use with the crankshaft 10 of FIG. 1 are shown. In both figures, the structure 20 includes a connecting plate 22 having first and second channels 24, 26. Preferably, the channels 24, 26 are generally perpendicular to each other and thus, define an open cross. In the embodiment shown in FIG. 2a, the plate 22 is coupled to or further includes at least one piston 28 (FIG. 2a). In FIG. 2b, two opposed pistons 28, 30 are connected or coupled to the opposed ends of the plate 22, which is shown as being slightly elongated. Preferably, the plate 22 is at least slightly less in width than the diameter of the corresponding piston 28, 30, such that it does not interfere with the movement of the piston in the corresponding cylinder. Each piston 28 or 30 present may be associated with a corresponding combustion chamber of an engine, as is known in the art. As would be understood by a skilled artisan, the embodiment of FIG. 2a is adapted to any type of arrangement where a piston/cylinder combination is required, while the embodiment of FIG. 2b is best suited for use in an arrangement wherein a pair of cylinders are positioned in an opposed relationship (such as the horizontally opposed pistons typically used in aircraft engines).

Figure 3A:
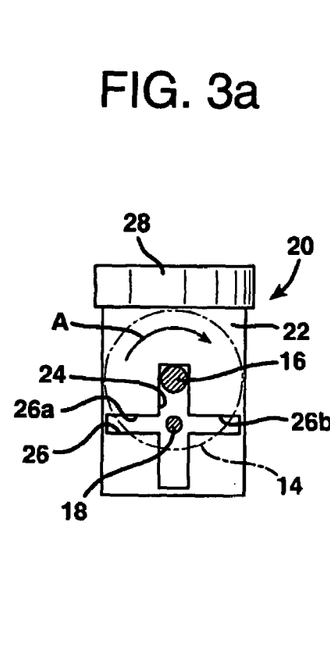
FIGS. 3a–3d are progressive front views showing one mode of operation of the crankshaft and a single connecting structure.
Figure 3B:
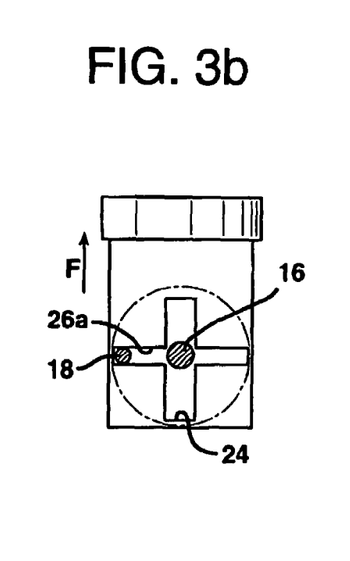

In use, the connecting structure 20 is associated with the crankshaft 10 such that the main continuous journal 16 is positioned or received in the first channel 24 and the second journal 18 is positioned along the second channel 26. For example, as shown in FIG. 3a (which is a generally schematic, partially cross-sectional view taken through the first and second journals 16, 18, which are shown as being different sizes from those in FIG. 1), when the connecting structure 20 is retracted (such as after an explosion in the combustion chamber), the first journal 16 is positioned at the first end of the first channel 24 (which is the upper end as shown in FIG. 3a). The second journal 18 is generally in the center of the second channel 26 (that is, at the center of the cross, which is defined by the intersection of the first and second channels 24, 26). As the crankshaft 10 (which is shown having disk-shaped crank structures 12, as described further below) rotates in the clockwise direction (note action arrow A), the second journal 18 makes contact with an engagement surface 26a defined along one side of the channel 26 and serves to move the connecting structure 20 and hence piston in a first direction (see action arrow F). As this occurs, the first journal 16 moves along the first channel to a generally centered position (see FIG. 3b).

Figure 3C:
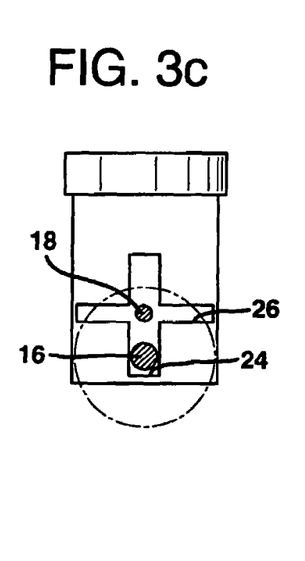
Figure 3D:
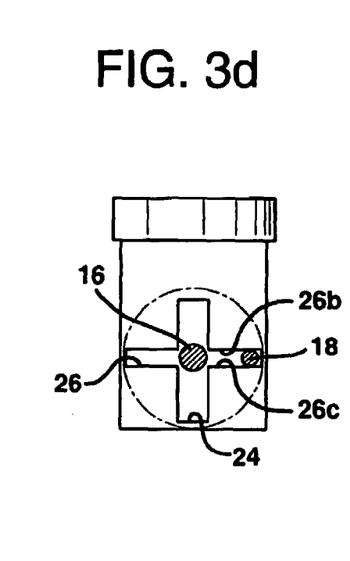

As the rotation continues, the connecting structure 20 moves to the maximum displacement in direction F (usually called "top dead center" in the case where a conventional connecting rod is used), with the second journal 18 returning to the center position and the first or main journal 16 moving to the opposite end of channel 24 (FIG. 3c). The rotation then continues such that the second journal moves toward the end of channel 26 and the first journal 18 reaches the center position (FIG. 3d). At this juncture, it is noted that, if the connecting structure 20 is being subjected to loading, such as if an explosion is driving the piston 28 in a direction opposite direction F, then the engagement is between the second journal and a second engagement surface 26b of the channel 26 corresponding to engagement surface 26a. However, if no force is being placed on the connecting structure 20 to cause it to engage surface 26b (such as in the embodiment shown in FIG. 9), then the engagement may be with the opposite surface 26c. As should be appreciated, the first journal 16 essentially remains stationary as the connecting structure 20 moves up and down in the vertical plane (which is generally parallel to the direction F). Thus, it has little interaction with the connecting structure 20.

Figure 4A:
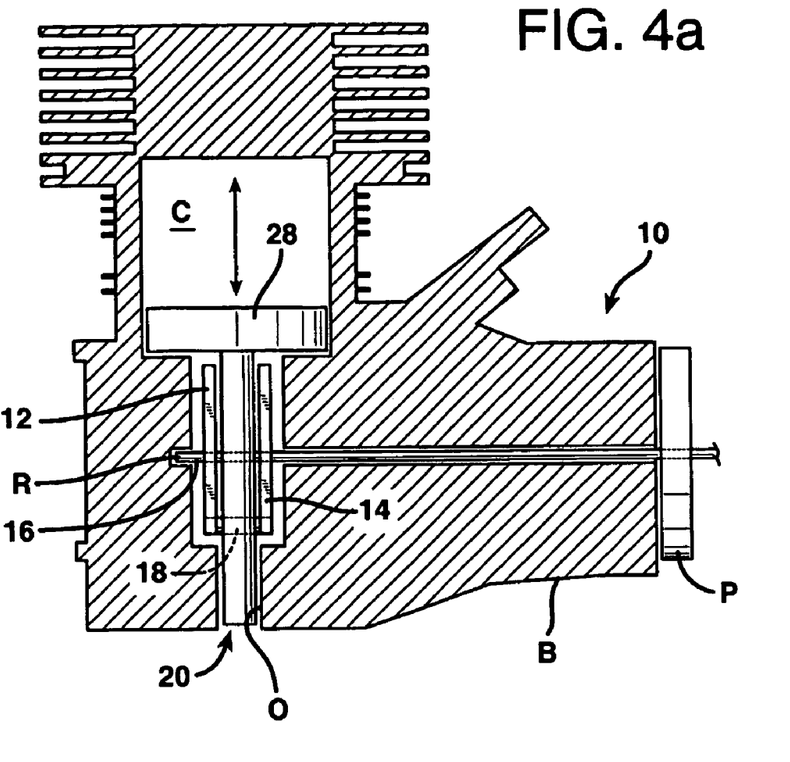
FIG. 4a is a side schematic view showing one possible environment in which the crankshaft and connecting structure of the present invention may be used.

FIG. 4a shows a schematic view of the crankshaft 10 and connecting structure 20 of the present invention in use on a single cylinder engine. The piston 28 is held in a combustion chamber C and is connected to the connecting structure 20, substantially as shown in FIGS. 3a–3d. The first and second journals 16, 18 are oriented in the corresponding channels 24, 26, and their positions might correspond to those shown in FIG. 3a, since the piston 28 is at bottom dead center. One end of the continuous journal 16, which is shown extending completely through both crank structures 12, 14, is held in a recess R formed in the cylinder block B at one end. The opposite end is keyed or otherwise coupled to a pulley P, gear, or like structure for transmitting rotary motion. Second journals 18 extend at least between the inner opposed surfaces of the crank structures 12, 14. As should be appreciated, the crank structures 12, 14 maybe elongated arms (see, e.g., FIG. 1), disks (see, e.g., FIGS. 3a–3b and 4b), or any other shape (e.g., a portion of a disk), as long as the journals 16, 18 are adequately supported from both sides in the proper orientation for receiving or transmitting motion to the connecting structure 20. An opening O or recess may also be provided for receiving the bottom portion of the connecting structure 20 as it reciprocates (but see FIGS. 10 and 11, which illustrate embodiments that would eliminate the need for this opening O or recess).

Figure 4B:
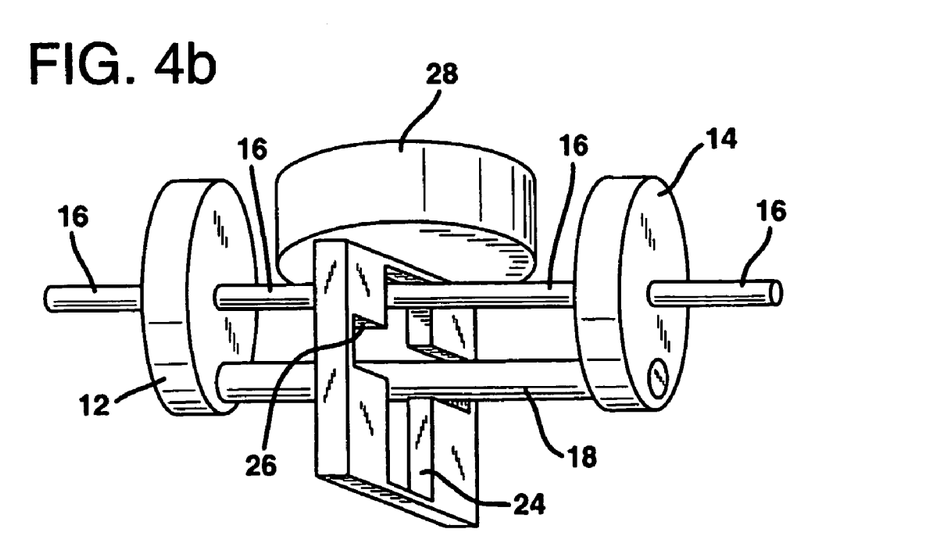
FIG. 4b is a perspective view showing another possible embodiment of the crankshaft and connecting structure of the present invention.

FIG. 4b schematically illustrates an arrangement similar to the one shown in FIG. 4a, but is expanded slightly by oversizing the spacing between the crank structures 12, 14 to show the position of the journals 16, 18 in the channels 24, 26. As can be seen, the first or continuous main journal 16 extends not only between, but through the crank structures 20 and is positioned in the second channel 26, while the second journal 18 merely extends between these structures and is positioned in the first channel 24. As previously mentioned, the crank structures 12, 14 may be in the form of disks. The piston 28 is generally connected to one end of the connecting structure 20, and is actually shown as moving into the space between the crank structures 12, 14 in the retracted position, which of course is optional (and can be adjusted by increasing the length of the upper end of the connecting structure 20 or using arms as the crank structures 12, 14 instead of disks).

Figure 5:
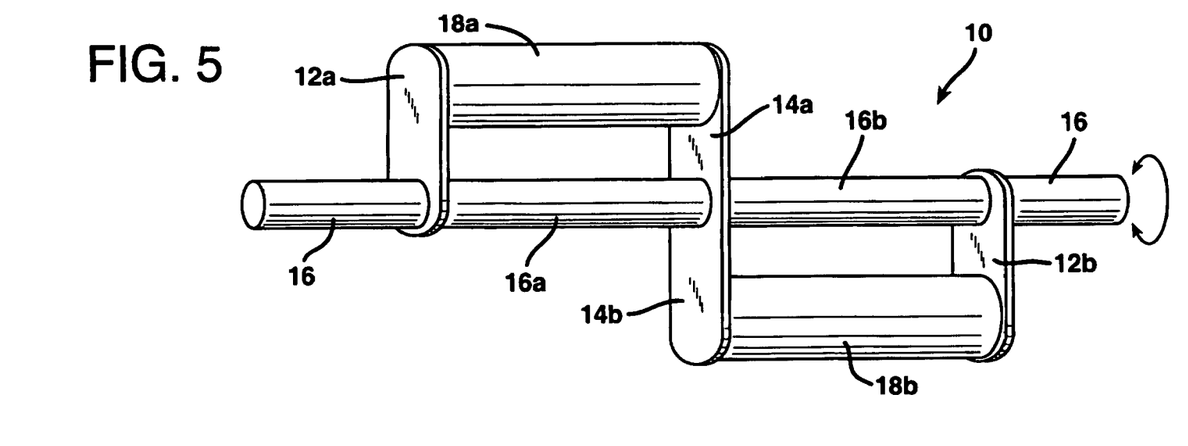
FIG. 5 is a perspective view of another possible embodiment of a crankshaft for being driven by two or four pistons.
Figure 9:
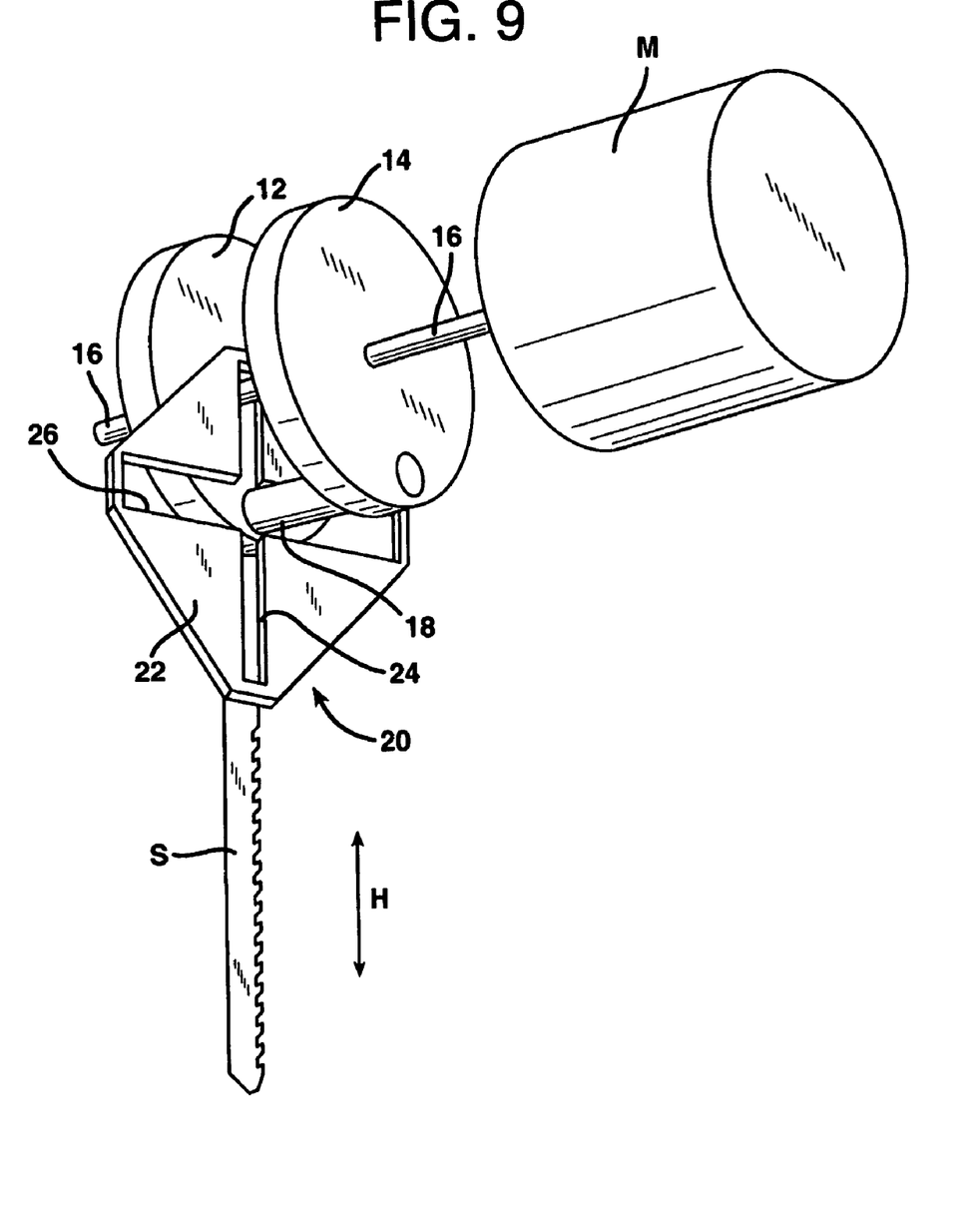
FIG. 9 is a slightly enlarged perspective view showing an alternate application of the crankshaft and connecting structure of the present invention.

As should be appreciated, in addition to using the crankshaft 10 of the present invention with a single connecting structure 20 connected to a single piston (i.e., a one cylinder engine), several such connecting structures may be used to drive the crankshaft (or may be simultaneously driven by the crankshaft, as in the embodiment of FIG. 9). For example, as shown in FIG. 5, first and second crank structures 12a, 14a may be connected to a continuous journal 16 along one portion thereof. The second crank structure 14a may also extend in a direction generally opposite the direction in which crank structure 12a projects to form a third crank structure 14b (which could be a separate structure). A fourth crank structure 12b is then provided projecting in this same direction. The continuous, uninterrupted main journal 16 extends through and interconnects all four crank structures 12a, 12b, 14a and 14b, thereby strengthening the resulting crankshaft 10 and improving its resistance to bending or deflection. However, only one second journal 18a, 18b extends between each pair of crank structures 12a, 14a; 12b, 14b. Thus, the corresponding portion of main journal 16a adjacent to the second journal 18a may be associated with a first connecting structure (either one piston or two piston, neither of which is shown in FIG. 5), while the corresponding portion of the main journal 16b and the other second journal 18b are associated with a second connecting structure (not shown). As should be appreciated, when two pistons are connected to each connecting structure 20 (see, e.g., FIG. 5b), twice as many pistons may be associated with the same length and size of crankshaft as would be required for engaging two pistons using the conventional connecting rod arrangement (unless two separate connecting rods are attached to each "throw" (second journal), which further increases the bending problem).

Figure 6:
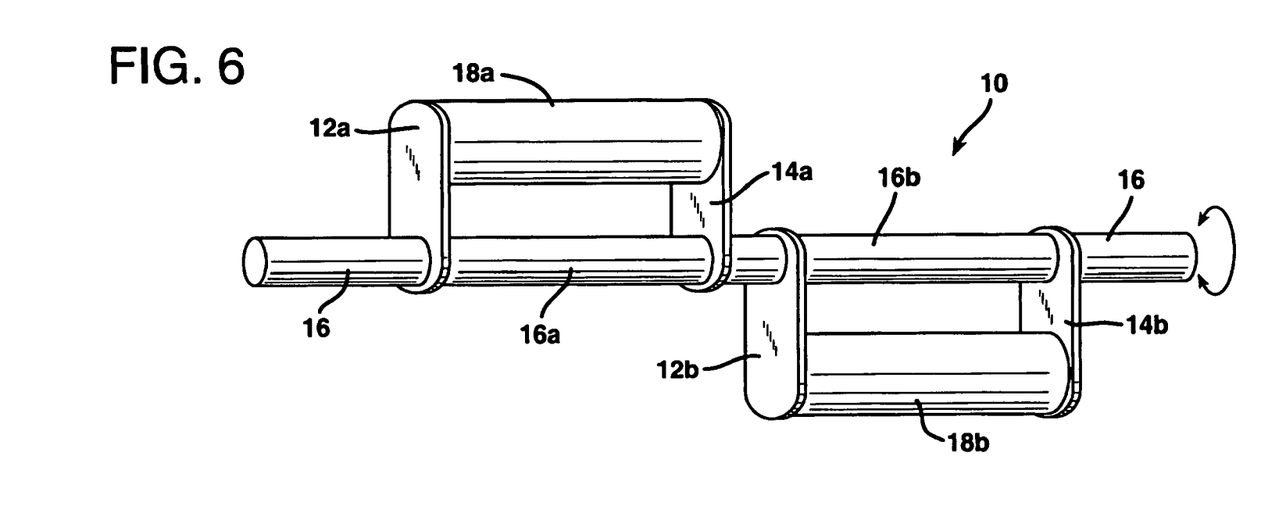
FIG. 6 is an alternate embodiment of the crankshaft of FIG. 5.

Instead of using a unitary crank structure 14a, 14b to engage both second journals 18a, 18b, providing separate, spaced crank structures is also an option. Thus, as shown in FIG. 6, the continuous journal 16 still engages four crank structures 12a, 14a; 12b, 14b. However, the first two structures 12a, 14a are associated with a separate and distinct second journal 18a, while the second two structures 12b, 14b are associated with second journal 18b. Of course, portions of the main, continuous bearing journal 16a, 16b are positioned adjacent to the corresponding portions of second journals 18a, 18b.

Figure 6A:
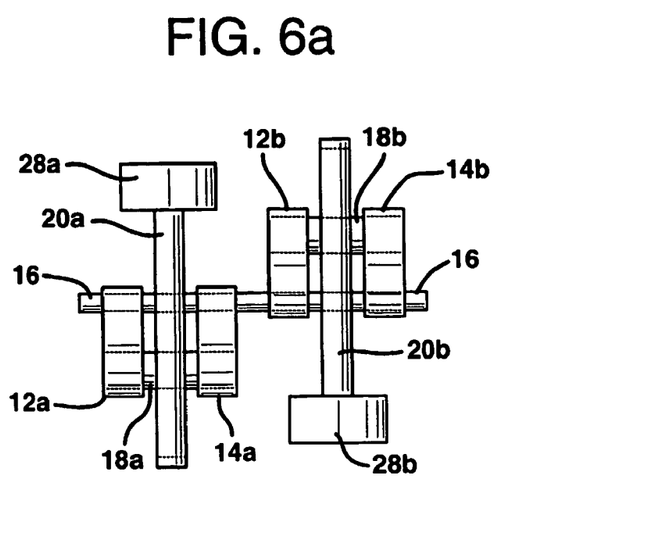
FIGS. 6a–6c are different views of a crankshaft similar to the one shown in FIG. 6 in different states of operation.
Figure 6B:
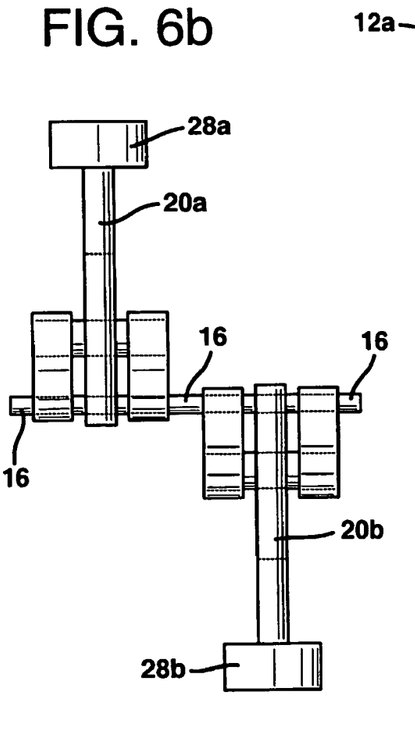
Figure 6C:
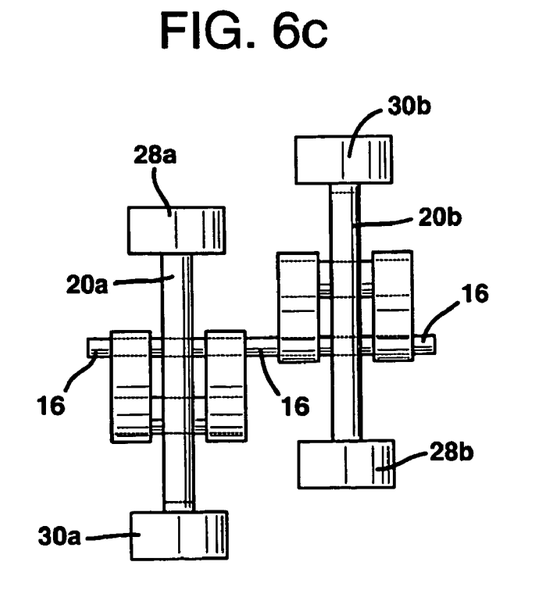

FIGS. 6a, 6b, and 6c schematically illustrate examples of how the crankshaft 10 of FIG. 6 may be associated with two pistons 28a, 28b or four pistons 28a, 28b; 30a, 30b in an opposed relationship. Specifically, FIG. 6 shows the crankshaft 10 with a continuous journal 16 and pairs of spaced crank structures 12a, 14a; 12b, 14b supporting journals 18a, 18b, respectively (which are wider than those shown in FIG. 5, which is an option that may further enhance the strength of the crankshaft 10). The journals 16, 18a, 18b are connected to two connecting structures 20a, 20b, each of which carries a single piston 28a, 28b at the opposite end. The pistons 28a, 28b are shown at the bottom dead center positions in FIG. 6a (such as after combustion in the corresponding chambers occurs) and in a top dead center position in FIG. 6b (such as after compression occurs, but prior to the next explosion). The manner in which two pistons 28a, 30a; 28b, 30b are simultaneously driven in an opposed fashion to engage and move each connecting structure 20a, 20b in the pattern shown in FIGS. 3a–3d is shown in FIG. 6c.

Figure 7:
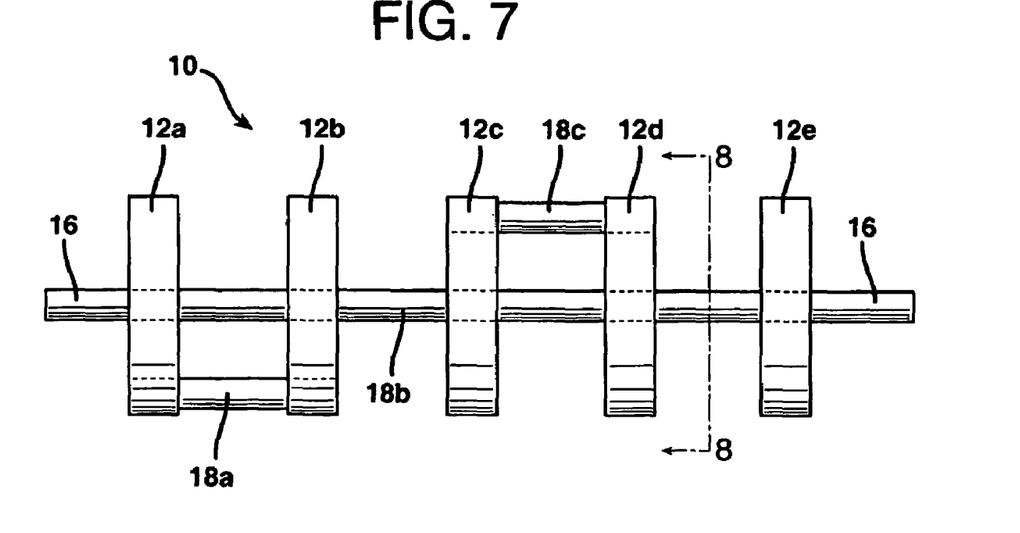
FIG. 7 is a side elevational view of yet another embodiment of a crankshaft of the present invention.
Figure 8:
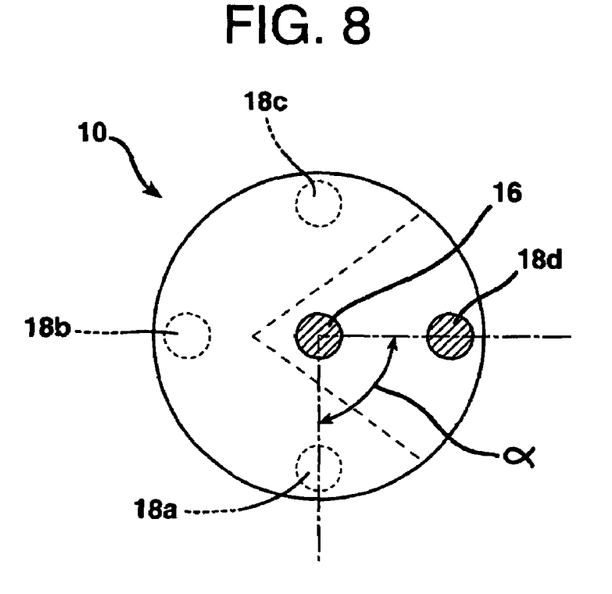
FIG. 8 is a partially cross-sectional view taken along line 8—8 of FIG. 7.

As mentioned above, the crank structures 12, 14 may also be in the form of disks. FIG. 7 shows an embodiment where five such structures (labeled 12a–12e for purposes of clarity, and not to suggest that crank structure 14 is necessarily different) are provided on a continuous journal 16. Preferably, the continuous journal 16 extends through the center of each disk 12a–12e. Second journals 18 may be provided between selected pairs of adjacent disks 12a–12e and preferably engage or extend through the peripheral region of each. As perhaps best understood with reference to FIG. 8, the embodiment shown includes the four second journals 18a, 18b, 18c, and 18d (although second journal 18d is obscured by main journal 16 in FIG. 7).

As should be appreciated, this crankshaft 10 of FIG. 7 may be driven by four or eight pistons using the connector structure 20 shown in either FIG. 2a or 2b, respectively. As should be further appreciated, the instant at which each piston present transmits motion to the crankshaft 10 may be controlled by adjusting the position of the second journals 18a–18e around the adjacent disks 12a–12e. Thus, as perhaps best understood with reference to FIG. 8, which is a cross-sectional view taken along line 8—8 of FIG. 7, spacing the second journals 18a, 18b, 18c, 18d at 90° (see angle α) causes the transmitting of motion from the pistons to the crankshaft 10 to be staggered (including on both sides, when opposed pistons are used). Likewise, if the journals 18a–18d are not spaced, the corresponding pistons would all be at the same position at the same time (again, on both sides when two pistons are associated with each connecting structure 20). These options give the engine designer a significant amount of freedom when using the crankshaft 10 of the present invention. Instead of a disk or arm, it is also noted that each crank structure 12 or 14 may comprise a portion of a disk (note dash-dot lines in FIG. 8) and still achieve the same function in a reliable manner.

Thus, as can be seen, using the crankshaft 10 and connecting structure 20 in combination results in an arrangement that provides several advantages over prior art proposals. First of all, the first continuous journal 16, 18 extending between all crank structures 12, 14 eliminates discontinuities that are characteristic of prior art crankshafts. This feature, coupled with the use of second journals 18 for connecting selected adjacent pairs of crank structures 12, 14, strengthens the crankshaft 10 and makes it more resistant to bending during operation. The use of connecting structure 20 eliminates the need for connecting rods and reduces the amount of vibration experienced by the crankshaft 10. Moreover, when used in combination with the connecting structure 20 having a piston at each end, both pistons can be connected to the crankshaft 10 using a single "throw" (i.e., second journal). This may allow for a significant reduction in the length and overall weight of the crankshaft 10, and may also allow for a reduction in the spacing between the pistons 28, 30.

FIG. 9 illustrates a possible alternate use of the crankshaft 10 and connecting structure 20 of the present invention; namely, for driving a reciprocating device or tool, such as a saw blade S. Specifically, a motive device, such as variable speed electric motor M, is used to transmit rotary motion to the main journal 16. This causes the crank structures 12, 14 to rotate, which essentially moves the second journal 18 in a circular pattern. Since the second journal 18 is held in the channel 26, it causes the connecting structure 20 to reciprocate in the direction of action arrow H, thereby causing the saw blade S to move to and fro for cutting a workpiece (not shown). Preferably, the saw blade S is held in place and guided by guide structures (not shown).

Figure 10:
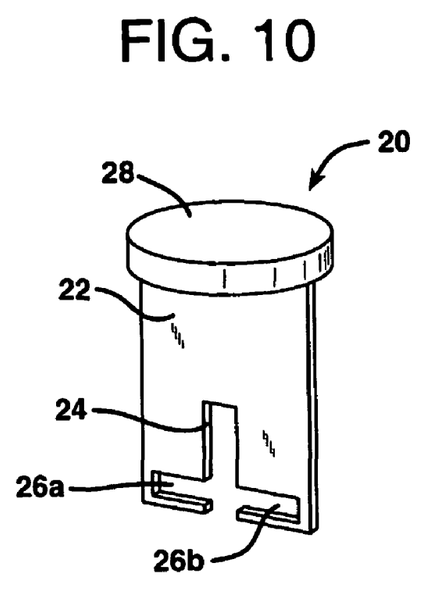
FIGS. 10 and 11 are generally front plan views of still other embodiments of the connecting structures.
Figure 11:
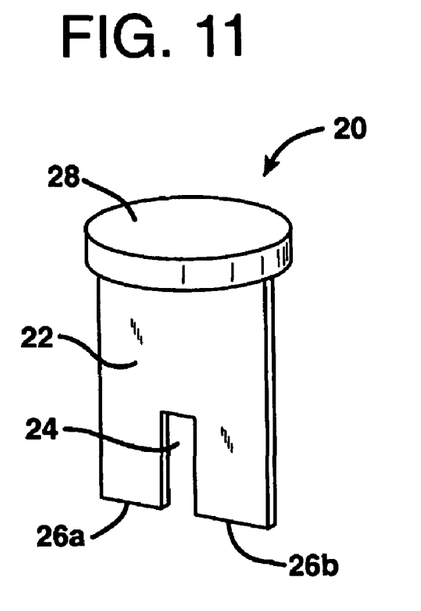

In cases where the crankshaft 10 and connecting structure(s) 20 are used for driving one or more single pistons to and fro in a single direction (such as in a V-shaped engine), it is possible to limit or eliminate the portion of the plate 22 extending beyond the lower edge of channel 26. Examples of such plates 22 are shown in FIGS. 10 and 11. This is possible because, as was discovered through experimentation, the second journal 28 may only engage surfaces 26a and 26b as the connecting structure reciprocates back and forth. Specifically, when the crankshaft 10 is rotating in the clockwise direction and a corresponding piston 28 is forced downwardly as the result of an explosion in the chamber (see FIG. 4b), the engagement is between surface 26b and the second journal 18. As the rotation of the crankshaft 10 continues, the engagement is between surface 26a and the second journal 18, which helps to return the piston 28 to the compressed position.

Figure 12:
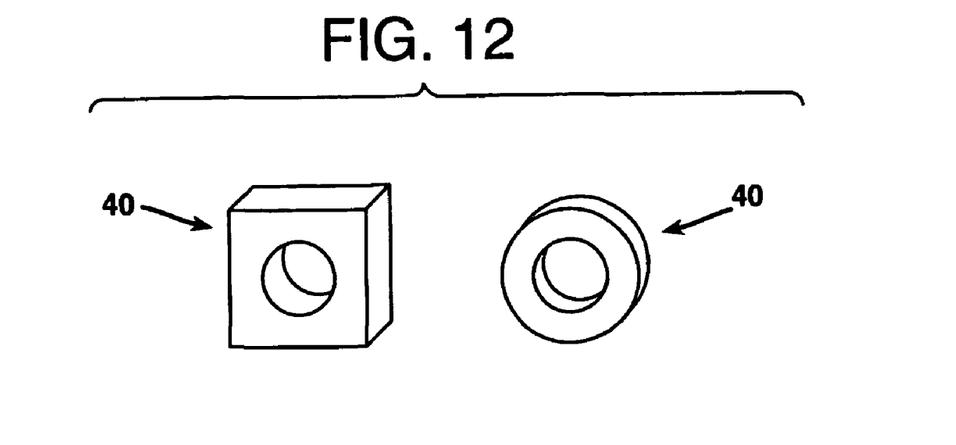
FIG. 12 is a perspective view showing bearing structures for possible use with the crankshaft of the present invention.

Finally, as shown in FIG. 12, a bearing structure 40 may be positioned on one or both of the main continuous journal 16 and the second journal 18 for engaging the corresponding surfaces 26a, 26b or channels 24, 26. The bearing structure 40 may be square or round and, of course includes an opening for receiving a portion of the corresponding journal 16 or 18. It can be sized for merely fitting in one of the channels 24, 26, or may be oversized (e.g., oblong or rectangular) for "bridging the gap" between the channels 24, 26 as it moves to and fro. Preferably, the bearing structure 40 is fabricated of a material with good tribological and wear characteristics to ensure a long service life.

Obvious modifications are possible in view of the foregoing teachings. For example, the journals 16, 18 are preferably round in cross-section and generally the same size. However, as depicted in the drawing figures, the journals 16, 18 may also have different cross-sectional sizes (in which case, the channels 24, 26, if present, have matching sizes for allowing the journals to move therein with a minimum amount of play). The ultimate selection of the size and shape of each journal depends on the demands and requirements of the particular application. Moreover, while the examples provided above refer to machines using internal combustion engines and tools requiring reciprocal motion, it should be appreciated that the crankshaft 10 and connecting plate 20 of the present invention could be applied to a myriad of applications where it is desired to convert rectilinear motion to rotary motion or vice versa. Moreover, while examples with one, two, four, and eight pistons are described, it should be appreciated that any number of pistons (whether odd or even) could be associated with the crankshaft 10 of the present invention by simply increasing the number of connecting structures 20. The crankshaft 10 and connecting structure 20 disclosed herein may also be used in conjunction with a method for converting rectilinear motion into rotary motion and vice versa.

The foregoing description of certain embodiments and aspects of the invention have been presented for purposes of illustration and description. They is not intended to be exhaustive or to limit the invention to the precise forms disclosed. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

The invention claimed is:

1. A crankshaft for converting rectilinear motion to rotary motion or vice versa, comprising:
    first and second spaced crank structures having opposed inner surfaces; and
    only two generally parallel journals positioned between the first and second crank structures,
    wherein each crank structure includes a center region and a peripheral region, wherein a first journal extends through the center regions and a second journal extends at least between the peripheral regions, whereby the first and second generally parallel journals extending between the crank structures strengthen the crankshaft.

2. The crankshaft according to claim 1, further including a third crank structure spaced from the second crank structure, said first journal being continuous and interconnecting the first, second, and third crank structures.

3. The crankshaft according to claim 2, further including a third journal spaced from and generally parallel to the first journal for interconnecting the second and third crank structures.

4. The crankshaft according to claim 3, wherein the second and third journals are not axially aligned.

5. The crankshaft according to claim 2, further including a fourth crank structure spaced from the third crank structure, said first journal being continuous and interconnecting the first, second, third, and fourth crank structures.

6. The crankshaft according to claim 5, further including a fourth journal spaced from and generally parallel to the first journal for interconnecting the third and fourth crank structures.

7. The crankshaft according to claim 6, wherein the first and second crank structures are elongated arms that project in a first direction and the third and fourth crank structures are elongated arms that project in a second direction generally opposite the first direction.

8. The crankshaft according to claim 6, wherein the first, second, third and fourth crank structures are generally circular disks, each having a center region through which the first journal extends in a continuous fashion and a peripheral region for engaging the second, third, or fourth journal, respectively.

9. The crankshaft according to claim 8, wherein the second, third, and fourth journals extending between the disks are not axially aligned.

10. A method of converting rectilinear motion into rotary motion or vice versa by rotating the crankshaft of claim 1.

11. An engine including the crankshaft of claim 1, and further, comprising a least one cylinder and at least one piston for positioning in said cylinder.

12. An apparatus for converting rectilinear motion to rotary motion or vice versa, comprising:
    a crankshaft mounted for rotation about an axis, said crankshaft including a plurality of crank structures and only two journals extending between said plurality of crank structures; and
    a connecting structure mounted for moving in a reciprocating fashion relative to the axis, said connecting structure including at least one channel for receiving a first journal and a surface for engaging a second journal or a bearing structure associated therewith as the connecting structure reciprocates,
    wherein each crank structure includes a center region and a peripheral region, wherein the first journal extends through the center regions of the crank structures and the second journal extends at least between the peripheral regions, whereby the reciprocating movement of the connecting structure causes the crankshaft to rotate or vice versa.

13. The apparatus according to claim 12, wherein the engagement surface is defined by a second channel in the connecting structure.

14. The apparatus according to claim 13, wherein the first and second channels are generally perpendicular to each other.

15. The apparatus according to claim 12, wherein the connecting structure is connected or coupled to a first piston at one end, whereby the piston provides the force for creating the rectilinear motion.

16. The apparatus according to claim 15, wherein the connecting structure is connected to a second piston at a second end, whereby the first and second pistons are associated with the first and second journals of the crankshaft and move in a horizontally opposed fashion to cause the crankshaft to rotate.

17. The apparatus according to claim 12, wherein the bearing structure associated with the second journal is adapted for engaging and traveling in the first channel.

18. The apparatus according to claim 12, wherein a plurality of second journals are provided, each extending between selected pairs of adjacent crank structures.

19. The apparatus according to claim 18, wherein the second journals are not axially aligned.

20. An apparatus for converting rectilinear motion to rotary motion or vice versa, comprising:
    a crankshaft mounted for rotation about an axis, said crankshaft including a plurality of crank structures having a center region connected by a first journal, at least two of said crank structures having a second journal extending between a peripheral region thereof;
    a connecting structure mounted to the crankshaft for moving in a reciprocating fashion relative to the axis as the crankshaft rotates, said connecting structure including a channel having opposed ends for receiving the first journal and a surface for engaging the second journal or a bearing structure associated therewith as the connecting structure reciprocates, wherein said channel is elongated in a first direction generally perpendicular to said axis of rotation and said surface extends in a second direction generally perpendicular to said first direction, such that the channel and the surface are oriented generally perpendicular to each other.

21. The apparatus according to claim 20, further including a motor for rotating the crankshaft.

22. The apparatus of claim 20, wherein the engagement surface is part of a second channel for receiving the second journal.

23. The apparatus according to claim 22, further including a third journal spaced from the first journal for interconnecting the second and third crank structures.

24. The apparatus of claim 20, wherein only the first and second journals extend between the at least two crank structures.

25. The apparatus of claim 20, wherein a third crank structure is spaced from the second crank structure, said first journal being continuous and interconnecting the first, second, and third crank structures.

26. The apparatus according to claim 20, wherein the third journal and the second journal are not axially aligned.

27. A crankshaft for rotating about an axis, comprising:
at least three spaced crank structures connected by a first journal, a first pair of said crank structures having a second journal extending therebetween and a second pair of said crank structures having a third journal extending therebetween.

28. The crankshaft according to claim 27, wherein the third journal and the second journal are not axially aligned.

29. The crankshaft according to claim 27, wherein the first journal extends between a center region of the crank structures, and in combination with a connecting structure mounted to the crankshaft for moving in a reciprocating fashion relative to the axis as the crankshaft rotates, said connecting structure including a first channel for receiving the first journal and a second channel generally perpendicular to the first channel for receiving the second journal.

* * * * *